United States Patent [19]

Day et al.

[11] Patent Number: 4,458,519

[45] Date of Patent: Jul. 10, 1984

[54] AIR PRESSURE OPERATED PROXIMITY SENSOR

[75] Inventors: George W. Day; Keith J. Latham, both of Dovercourt, England

[73] Assignee: Vacuumatic Limited, Harwich, England

[21] Appl. No.: 355,483

[22] Filed: Mar. 8, 1982

[30] Foreign Application Priority Data

Mar. 9, 1981 [GB] United Kingdom ................. 8107393

[51] Int. Cl.³ ........................ G06M 1/12; G06M 7/06; G01B 13/00

[52] U.S. Cl. ................................ 73/37; 235/201 ME; 73/37.7

[58] Field of Search .......................... 73/37.6, 37.7, 37; 209/551; 235/201 ME, 201 R, 98 R, 98 A, 91 F

[56] References Cited

U.S. PATENT DOCUMENTS

| | | | |
|---|---|---|---|
| 2,855,150 | 10/1958 | Jasperson | 235/98 R |
| 3,159,028 | 12/1964 | Hornbostel, Jr. | 73/37.7 X |
| 3,239,676 | 3/1966 | Pali | 235/98 R X |
| 3,465,777 | 9/1969 | Thornburn | 235/201 ME X |
| 3,702,925 | 11/1972 | Anderson et al. | 235/98 R |
| 3,746,841 | 7/1973 | Fenske | 235/98 R X |
| 3,981,180 | 9/1976 | Lovalenti et al. | 73/37.6 |
| 4,131,140 | 12/1978 | Peters | 141/206 |

FOREIGN PATENT DOCUMENTS

| | | | |
|---|---|---|---|
| 596142 | 4/1934 | Fed. Rep. of Germany | 235/98 R |
| 1275805 | 8/1968 | Fed. Rep. of Germany | 235/98 R |
| 965171 | 7/1964 | United Kingdom | 235/98 R |
| 1200213 | 7/1970 | United Kingdom | 73/37.6 |

*Primary Examiner*—Gerald Goldberg
*Assistant Examiner*—Tom Noland
*Attorney, Agent, or Firm*—Beveridge, DeGrandi and Kline

[57] ABSTRACT

The disclosure relates to an air pressure sensor comprising a first air passage, a branch passage having an opening into the air passage, a sensor in the branch passage responsive to variation in air pressure in the opening and jet means for air flow through the first passage adjacent the opening to the branch passage to create an increased depression in static pressure as compared with the remainder of the air passage to enhance the response of the pressure sensor in the branch passage when air flow through the first passage occurs. The air passage terminates in a probe having an orifice to be opened and closed by the absence of and presence of a surface in contact with the probe so that the pressure sensor indicates whether or not the probe is in contact with the surface. The arrangement is particularly suitable for counting a "shingled" stream of sheets such as signatures, the stream passing the orifice to the probe such that the orifice is opened and closed as successive sheets pass the probe, the resulting signal in the air pressure sensor being used to operate a counting device.

12 Claims, 8 Drawing Figures

AIR PRESSURE OPERATED PROXIMITY SENSOR

BACKGROUND OF THE INVENTION

1. Field of the Invention

This invention relates to air pressure sensors and is particularly although not exclusively applicable to air pressure sensors for use in batch counting apparatus such as apparatus for counting signatures delivered in a "shingled" stream from a printing machine to a batching machine to form the required batches of signatures for subsequent binding.

2. Description of the Prior Art

Various mechanical devices are available for counting stacks of sheets but none is suitable for counting a "shingled" stream of sheets or collections of sheets in signature form.

SUMMARY OF THE INVENTION

The invention provides air pressure sensor comprising a first air passage, a branch passage having an opening into the air passage, means in the branch passage responsive to variation in air pressure in the opening and jet means for air flow through the first passage adjacent the opening to the branch passage to create an increased depression in static pressure as compared with the remainder of the air passage to enhance the response of the pressure responsive means in the branch passage when air flow through the first passage occurs.

The air passage may terminate in a probe having an orifice to be opened and closed by the absence of and presence of a surface in contact with absence of and presence of a surface in contact with the probe so that the pressure responsive means indicates whether or not the probe is in contact with a surface.

More specifically the probe may be mounted on a swinging arm to bear against articles in a "shingled" stream of articles moving past the probe so that as the probe breaks contact with each article in turn and the increased air flow permitted through the orifice of the probe causes the pressure responsive means to be actuated.

Alternatively the probe may be mounted on a parallel linkage to bear on a shingled stream of articles moving past the probe so that the probe can rise and fall as the stream of articles passes below it.

The pressure responsive means may comprise an element located in the branch passage and displaceable along the branch passage in accordance with variation in pressure in the first passage and electric switch means may be provided to detect and respond to movement of the element towards the first passage when pressure therein falls.

Alternatively the pressure responsive means may comprise a solid state pressure transducer operated electric switch device.

DESCRIPTION OF THE PREFERRED EMBODIMENTS

Figure 1:
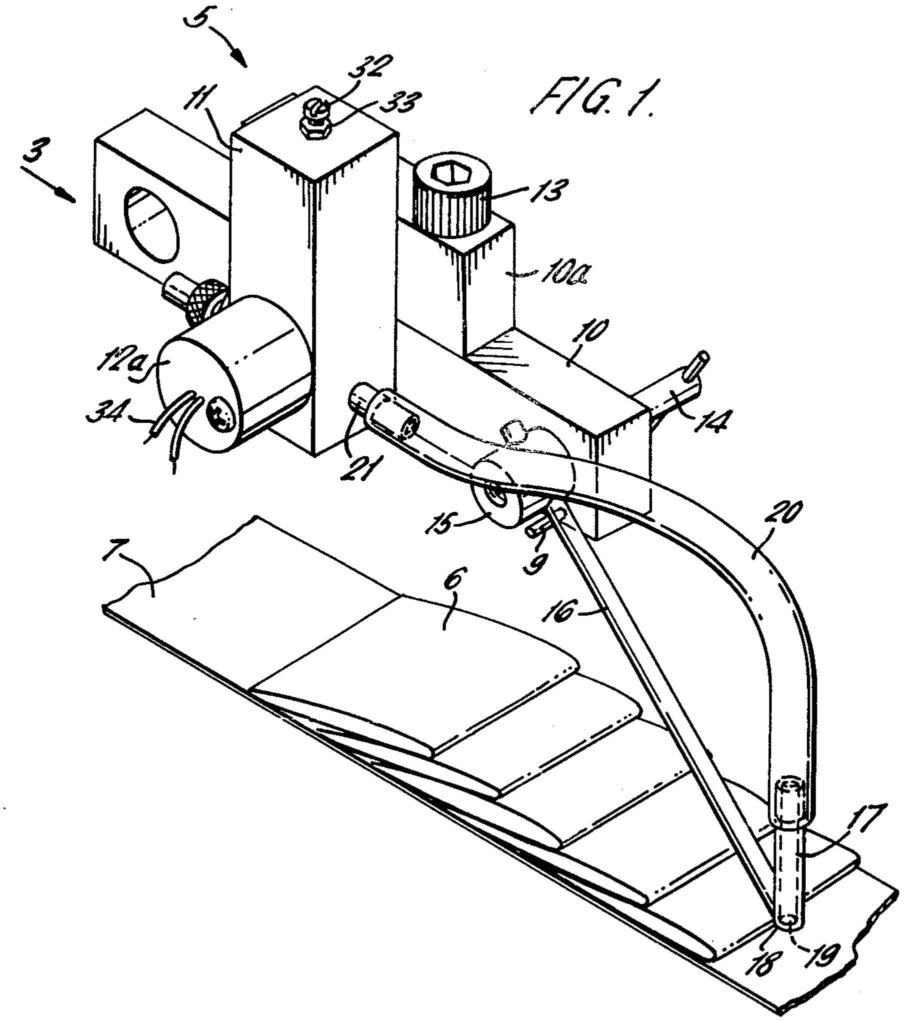
FIG. 1 is a perspective view of a probe and air pressure sensor for counting book signatures conveyed past the probe.
Figure 2:
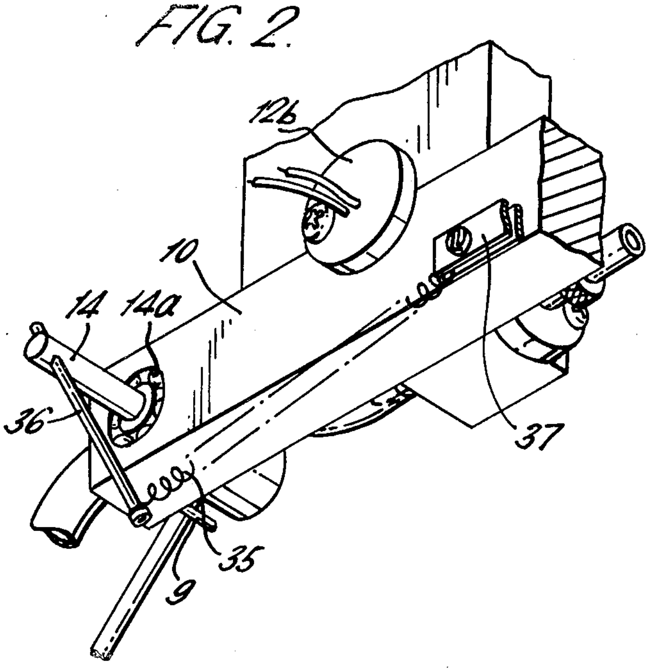
FIG. 2 is a perspective view of part of the reverse side of the probe and sensor shown in FIG. 1.

Referring firstly to FIGS. 1 and 2 of the drawings, there is shown a counting device for counting a shingled or staggered stream of book signatures 6 being carried by a conveyor 7 "fold-first" from a printing machine to a batching machine in which batches of the requisite number of signatures as determined by the counting device are batched for binding. The counting device 5 comprises a probe and pressure sensor assembly comprising an elongate base member 10 having on one side thereof an upstanding pressure sensor block 11. The sensor block 11 has units 12*a* and 12*b* with laterally projecting cylindrical housings 12 on either side thereof. One of these housings is received in a part cylindrical recess formed in the upper surface of the base plate 10 and is secured thereto by a clamping block 10*a* having a corresponding recess in its undersurface. The clamping block 10*a* is secured to the base 10 by bolts 13.

At one end of the base 10 there is an axle 14 rotatably mounted in a bore through the base to rotate about a horizontal axis in a bearing 14*a*. One end of the axle 14 has a boss 15 thereon to which an arm 16 is secured at one end. The other end of the arm carries a tubular probe 17 having a contact face 18 at one end thereof. The tubular passage through the probe terminates in a round hole 19 in the contact face. The other end of the probe receives one end of the flexible air tube 20 the other end of which is connected to a tubular metal conduit 21 extending into the lower end of the sensor block 11. Downward tilting of the arm is limited by a stop 9 on the block 10 again which arm 16 engages.

Figure 4:
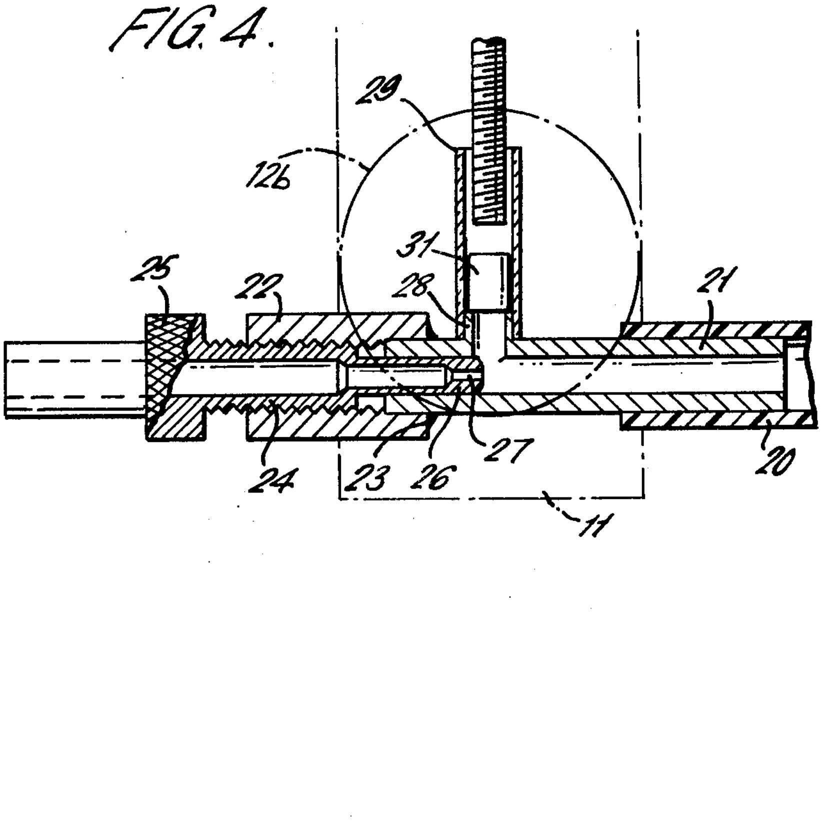
FIG. 4 is a sectional view through the sensor.

Referring now to FIG. 4 of the drawings, the detailed construction of the lower part of the sensor block 11 is shown. The tube 21 extends into the block into a sleeve 22 extending into the block from the other side thereof, the end of the sleeve 22 being welded to the tube 21 as indicated at 23. A jet 24 is screwed into the sleeve 22, the jet having an encircling knurled ring 25 and being formed with a reduced diameter portion 26 terminating in a jet orifice 27. The jet is connected to a source of air pressure which may be of the order of 12 to 40 lbs per square inch as required to provide an air flow through the jet and conduit 21.

The conduit 21 has a side branch formed by a short conduit 28 extending upwardly from the conduit 21 adjacent the outlet of the jet orifice. A glass tube 29 is fitted over the branch conduit 28 and extends upwardly therefrom through the block 11. A polytetrafluroethylene plunger 31 is located in the glass tube, the plunger having a diameter slightly less than the internal diameter of the tube so that the plunger can rise and fall in the tube. Downward movement of the plunger in the tube is limited by engagement of the plunger with the upper edge of the branch conduit 28. Upward movement of the plunger in the tube is limited by a bolt 32 screwed into the top of the sensor block and extending into the upper end of the glass tube 29. The bolt is locked in position by a lock nut 33 and the top of the sensor block.

The unit 12*a* provides a conventional light source for a photo-electric cell energized through wiring 34, the light source being directed across the sensor block 11 through the glass 29 adjacent the lower end of the stop screw 32. A conventional photo-electric cell is provided in the unit 12_b_ mounted in the housing 12 on the other side of the sensor block and is connected in a circuit arrangement to trigger a counting device (not shown). The light path between the light source and photo-electric cell is obstructed by the plunger 31 when the plunger is in engagement with the lower end of the bolt 32. When the plunger 31 falls to the lower limit of its travel in engagement with the branch conduit 28, the light path from the light source to the photo-electric cell is established and the resulting energization of the circuit containing the light source triggers the counter in the circuit to make one count.

The probe 17 of the counting device trails the axle about which it swings in the direction of travel of the conveyor 7 and is biassed downwardly into engagement with the top of the stream of book signatures 6 moving "fold-first" along the conveyor by a spring 35 extending between a lever arm 36 fastened in one end of the axle 14 and an anchorage 37 on the base member 10.

The probe 17 is intended to bear on the surface of a signature below it and the sensor is intended to detect whenever contact between the probe and the surface is broken as the probe passes from one signature to the next. Contact of the end 18 of the probe with the surface restricts the escape of air from the outlet hole 19 so that the system is held under pressure from the air supply connected to the jet 24. The air pressure in the system forces the plunger 31 to the upper limit of its travel against the bolt 32. The optical path between the light source and photo-electric cell is thus obstructed and the circuit for triggering the counting device is inoperative. The air pressure in the probe and the force of the spring are so selected that the probe end is supported on a cushion of air slightly above the surface of a signature so that there is some small continuous loss of air from the probe but wear of the contact end of the probe by rubbing on the signature surfaces is avoided. Also smearing of freshly applied ink to the signatures is avoided. When the probe 17 is separated from the said surface by engagement with the fold of the next signature, air is allowed to escape freely from the hole 19 and the air flow through the jet orifice 27 in the pressure sensor establishes a low pressure zone adjacent the branch conduit 28 which draws the plunger 31 rapidly down the tube 29 until it engages the stop provided by the end of the conduit 28. It has been found that with the embodiment illustrated an air pressure supply of 20 p.s.i. supplied has a loss of 10 p.s.i. at the probe outlet when the latter is adjacent a signature surface. On separation from the surface, the resulting vacuum adjacent the branch conduit 28 is 10 in. Hg. The optical path between the light source and photo-electric cell is no longer obstructed and the photo-electric cell causes the circuit associated with the cell to trigger the counting device to register a signature count. The probe rides up over the fold of the next signature to bear on top of that signature and air flow through the hole 19 is then again restricted. The resulting back pressure in the system restores the plunger to the top of its travel thereby blocking the light path from the light source to the photo-electric cell. Thus each time a signature passes under the probe, the outlet hole 19 is opened causing the counter to register the passage of the signature.

It will be appreciated that many modifications may be made to the above described embodiment without departing from the scope of the invention. For example, the plunger 31 could be replaced by a steel ball arranged to ride up and down the tube 29 in accordance with variations of air pressure therein.

It has also been found that the optimum ratio of the internal diameter of the conduit 21 to the jet orifice 27 is in the region of 2:1.

In a further embodiment of the invention the plunger/light source/photo-electric cell arrangement is replaced by a solid state pressure transducer operated electric switch and associated electronic circuitry for counting the signatures.

Figure 6:
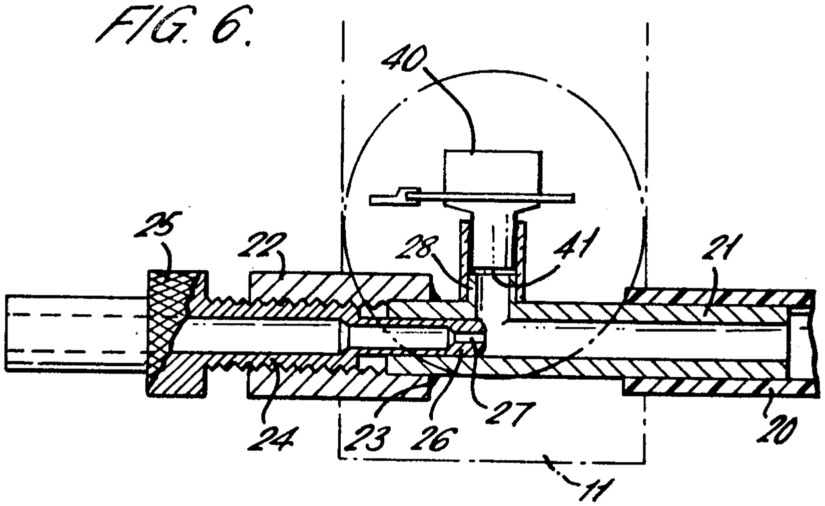
FIGS. 5 and 6 illustrate a further embodiment.
Figure 3:
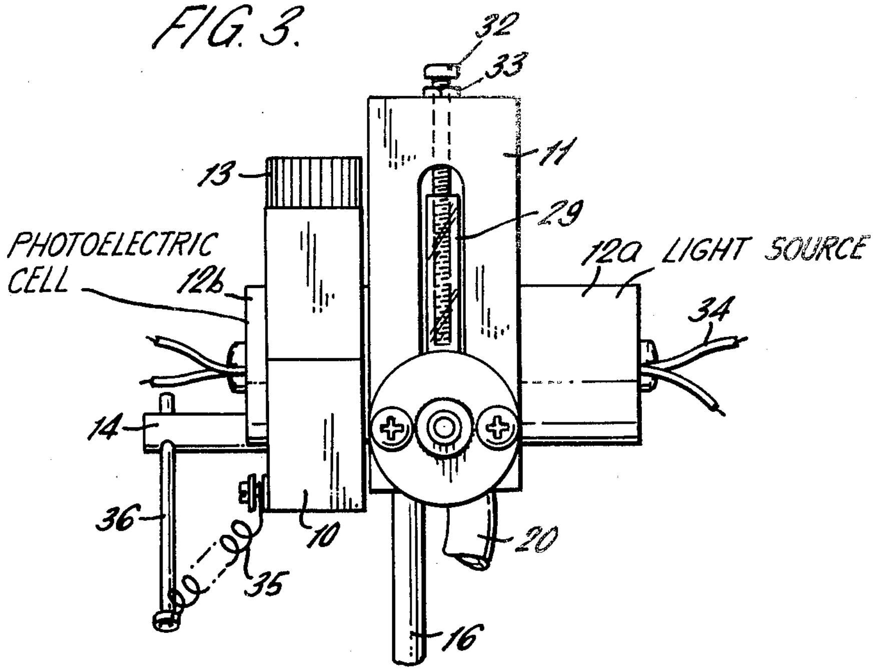
FIG. 3 is an end view in the direction of the arrow 3 on FIG. 1.
Figure 5:
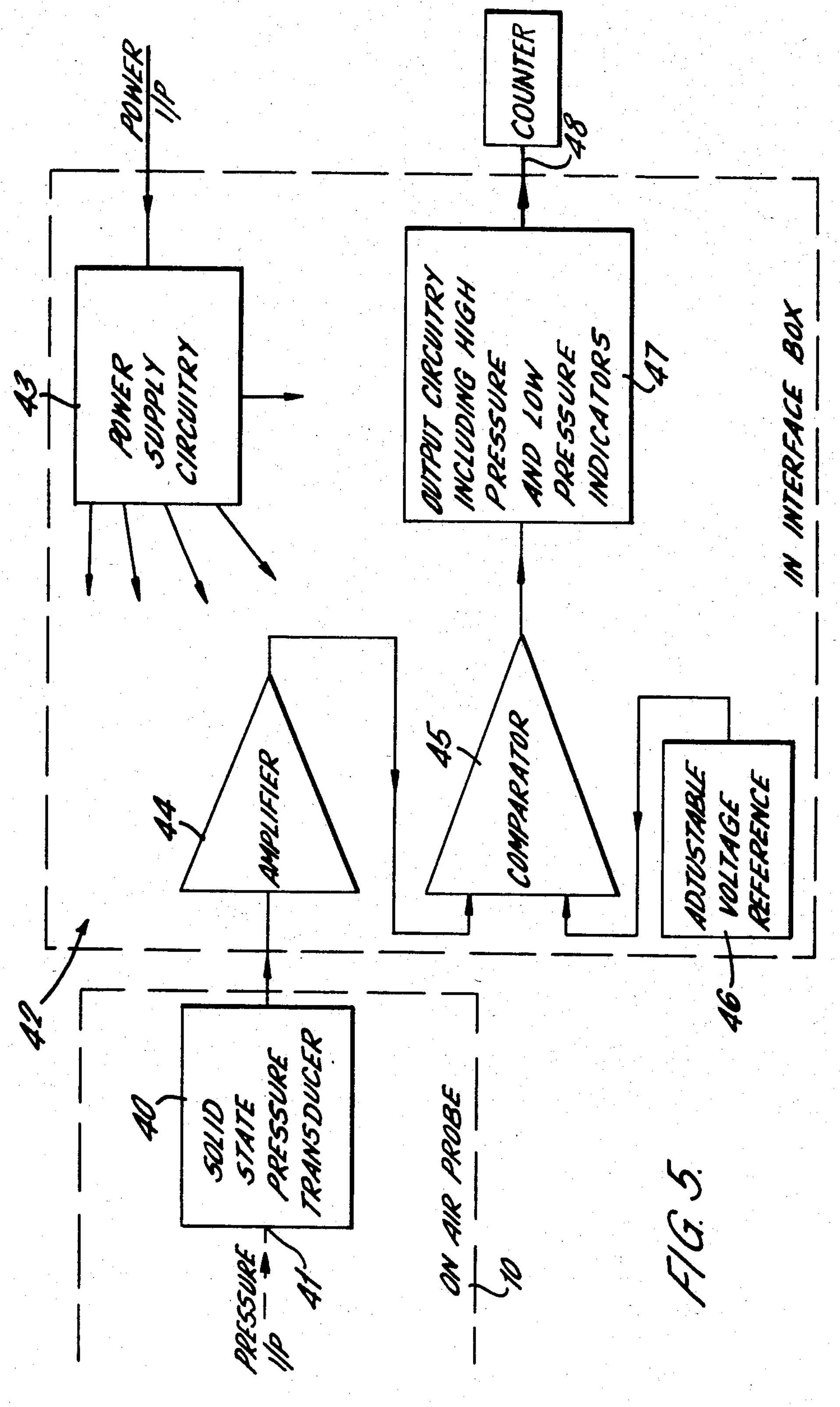

Reference is now made to FIGS. 5 and 6 of the drawings which illustrates, respectively, the electronic circuitry for the solid state transducer operated version of the probe and a modification of the arrangement shown in FIG. 4 to accept the solid state transducer. In the solid state version of the probe, the photoelectric cell and associated light source and the plunger 31 are omitted. In their place, a solid state pressure transducer 40 is mounted on the branch conduit 28 with the pressure input side 41 of the transducer in communication with the conduit 21 immediately downstream of the jet orifice 27. The transducer 40 is connected to a circuit system indicated generally at 42 having a power supply circuit 43 and including an amplifier 44, a comparator 45 also connected to an adjustable voltage 46 and an output circuit 47 which includes high and low pressure indicators to indicate the mode of operation of the probe and a connection 48 to a counter to count each time the transducer triggers the circuit. The pressure transducer may, for example, be a transducer sold under the name "Monolithic Pressure Transducer" by National Semiconductor Corporation.

The apparatus operates in a similar manner to that of the first embodiment described. Thus when the first signature of a stream arrives, the probe arm climbs the leading edge, and the nozzle partially seals against the signature surface. There is an immediate drop in air flow, and therefore a step increase in air pressure within the feed pipe. This pressure change is sensed by a solid-state pressure transducer integrated-circuit device, which in conjunction with an operational amplifier circuit, produces a logic signal representing a single count. When the second and subsequent signature leading edges arrive at the probe tip, the air pressure momentarily falls as the nozzle climbs each edge, then rises again as the nozzle seals against the signature surface. Thus, a count pulse is obtained for every signature.

The solid state pressure transducer is mounted within the mechanical assembly of the probe, with a four-core screened cable (2 m long) provided for connection into the separate interface box. The electronics unit within the interface box provides the means for two important paramaters to be controlled.

There are:

(a) the pressure threshold at which the logic output switches to produce a count pulse.

(b) the amount of hysteresis i.e. the amount by which the pressure must subsequently fall in order for the logic circuit to terminate the count pulses.

Different types of signatures, notably those varying in thickness, may require different pressure threshold settings. In order that a user can easily select the correct conditions for optimum count performance on signatures within a pre-determined thickness range, a three position switch is provided. In each switch position, separate preset controls are brought into operation for pressure threshold. Red and green indicator LED's are provided so that the operation of the device can be monitored visually. The green LED "LO" lights when the probe nozzle is clear of the signature surface. The red LED "HI" lights when the nozzle is sealed by the signature surface (i.e. one count pulse generated).

The interface box has a clear plastic front, through which may be viewed (a) the red and green LED indicators "HI" and "LO"

(b) The pressure threshold preset potentiometers (self indicating against a 1–10 scale)

(c) yellow LED indicators indicating the pressure threshold selected by the user, with legends showing the signature thickness range appropriate to that setting. (THIN, MEDIUM or THICK).

The three position switch available to the user has a shaft protruding through the clear plastic lid, and is fitted with a collet knob.

It will be understood that the pressure-transducer is a strain-sensitive semi-conductor bridge. Pressure applied to the transducer port induces a strain which changes the out-of-balance voltage across the bridge. The bridge is provided with a stable D.C supply of say, 6.9 volts, from a reference voltage source. The bridge output voltage is applied across the differential inputs of an operational amplifier, operated at a fixed gain of 15. The amplifier output is applied to a second stage operational amplifier, which functions as a Schmidt trigger with a fixed degree of hysteresis (to obtain clean switching, with no jitter around the threshold point).

The fixed amount of hysteresis applied is however considerable; this also ensures that once a signature edge has been detected, the system becomes insensitive to minor pressure drops due to imperfect tip sealing as the probe traces the signature surface. The logic signal will only revert when a considerable pressure drop is experienced, such as the next signature edge. The hysteresis also suppresses any tendency for relaxation oscillation at the tip, due to the interaction between upward force due to the air escaping the nozzle, and the downward spring pressure acting on the probe arm. The second stage also introduces an offset, of a magnitude determined by the value of a PRESSURE THRESHOLD preset potentiometer, selected by the three position user switch. The voltage source for the offset current is the 6.9 v stable source for the bridge excitation. The output of the second operational amplifier stage is used to switch transistors controlling differentially the red and green LED indicators, and also a switching transistor from whose open collector the output pulse is taken. For 5volt operation, a voltage-doubler arrangement provides the higher supply for the operational amplifiers and the pressure-transducer bridge supply. As the supply voltage increases towards +24 V, the voltage-doubler circuit becomes progressively bypassed. Metal-film resistors, of low temperature coefficient give stable gain and offset in the high-gain differential-input operational amplifier, while the precision reference voltage source for the pressure transducer bridge ensures a low temperature-coefficient of span in the pressure/voltage transfer function.

It has been found that signatures over the thickness range 0.008" to >0.250" are countable provided that the individual signatures are spaced apart by 0.25" minimum, and counting rates up to 20 per second (72,000/hour) are possible.

The probe may be arranged to act on signatures fed "fold-first" by the conveyor beneath the probe or the probe may be arranged under the path of movement of the signatures in the case where side belt conveyors are used and the probe is spring biassed upwardly to act on the underside of the stream of signatures passing over it.

Figure 7:
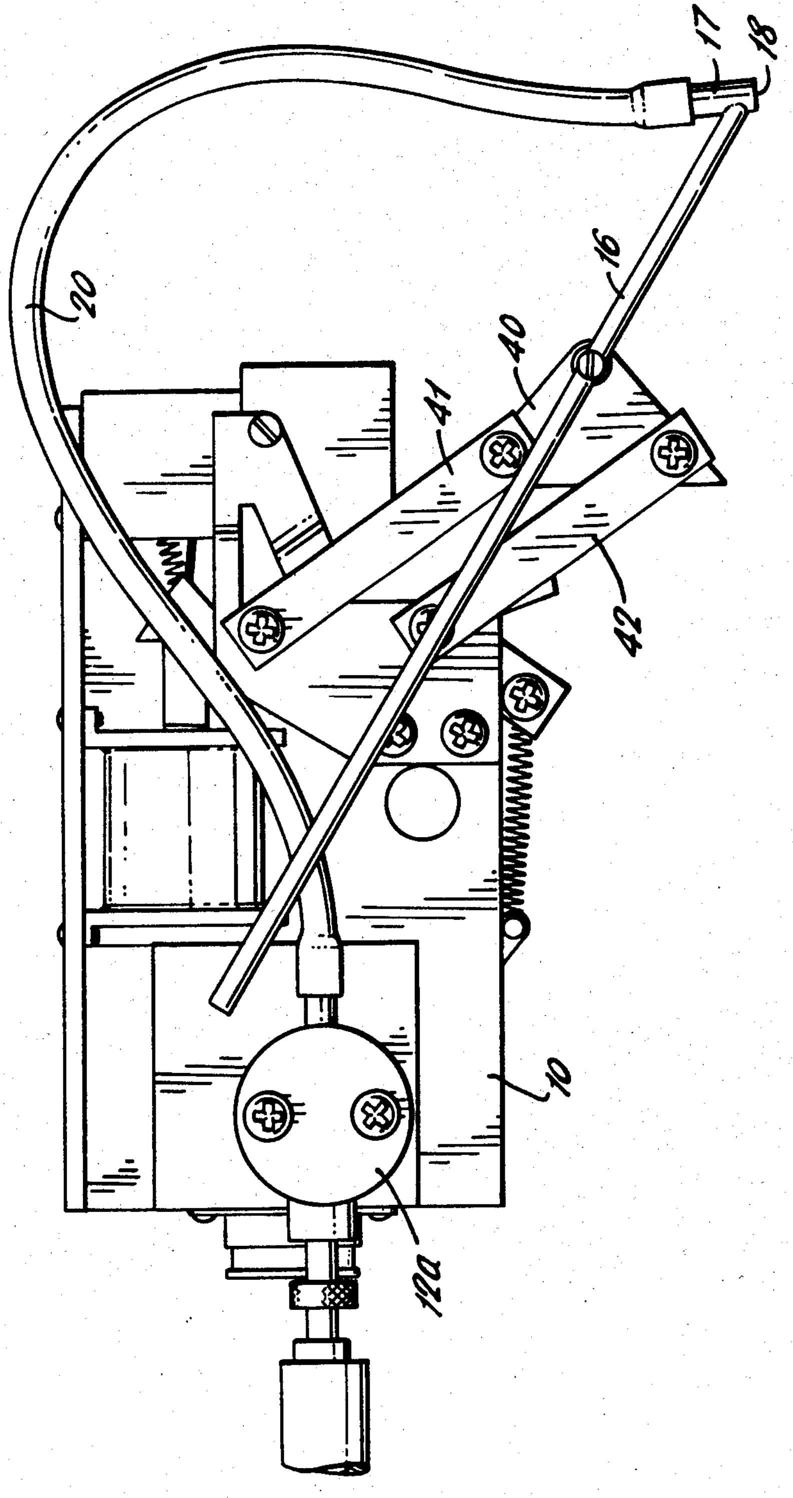
FIGS. 7 and 8 show a still further embodiment.
Figure 8:
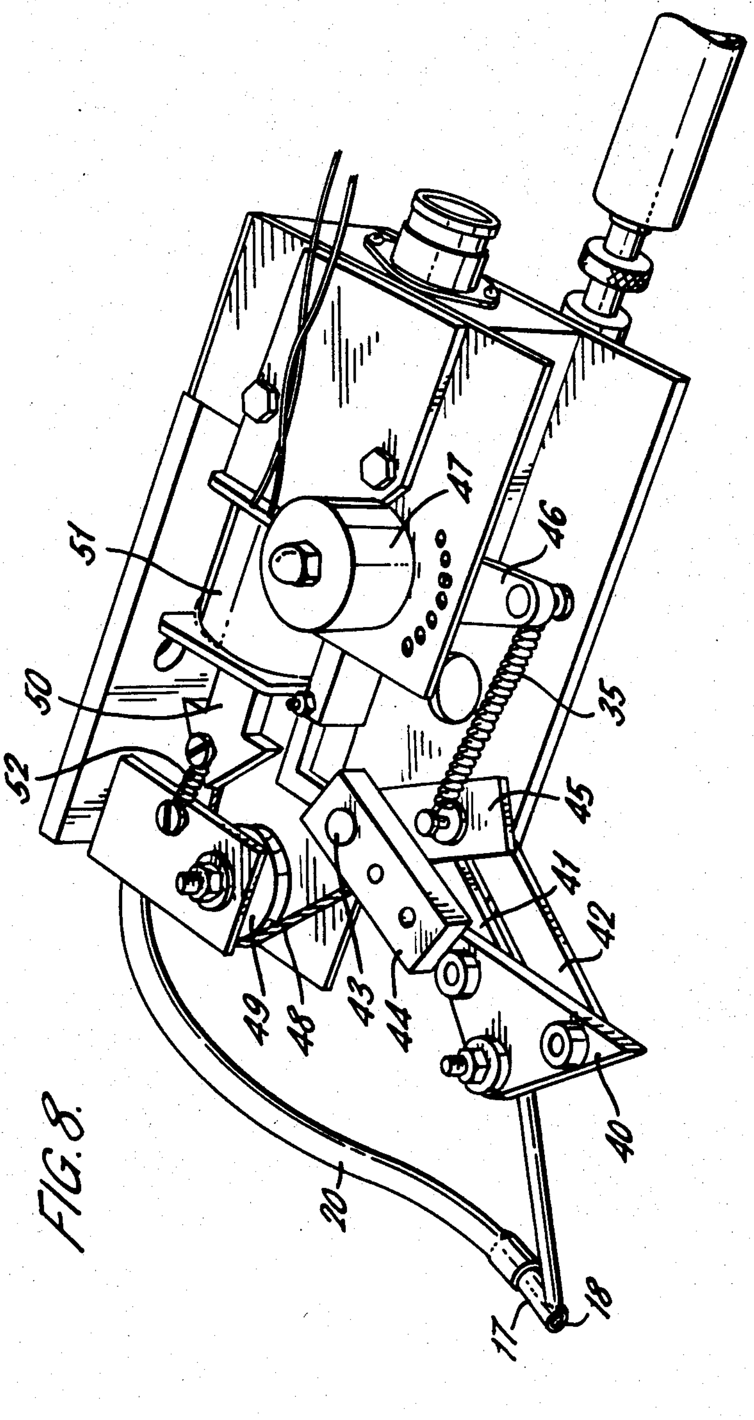

Reference is not made to FIGS. 7 and 8 which show a further embodiment of the invention. The arrangement is generally similar to that described earlier and like parts have been allotted the same reference numeral. The embodiment differs in that the probe arm 16 is mounted on the base 10 by a parallel pivoting linkage 40, 41, 42 in place of the simple pivot described earlier. Thus the contact face 18 of the probe 17 maintains a constant attitude to the book signatures when rising and falling as they pass beneath it. One link 42 of the linkage is pivotally mounted on an axle 43 on the base which extends through the base and carries two angularly spaced arms 44, 45 on the opposite side of the base to the parallel linkage. A tension spring 35 is anchored at one end to the arm 45 and at the other end to a lever arm 46 having an adjustable mounting 47 on the base for varying the tension in the spring 35 and therefore varying the downward bias of the probe. The other arm 44 is connected by a tether 48 extending round a pulley 49 mounted on the base to an armature 50 of a solenoid 51. A control is provided for the solenoid for retracting the armature 50 to draw the tether 48 in a direction to raise the probe 17 away from the path of the signatures into an inoperative position when the probe is not required for use. The armature 50 of the solenoid is spring biased outwardly by tension spring 52 to draw the armature outwardly when the solenoid is not energised and thereby allow the probe to fall under the influence of the tension spring 35.

In the arrangements described above, absolute pressure drops are detected by the system for indicating the passing of a signature below the probe. A measuring system can however be provided for detecting the rate of change of air pressure in the air pressure supply to the probe to indicate the passing of a signature below the probe.

We claim:

1. An air pressure operated proximity sensor for use in apparatus for counting articles in a shingled stream of articles, said sensor comprising a first air passage leading to a probe having an orifice to be opened or restricted by the absence or presence of a surface adjacent the probe to detect when the probe passes from one article to the next, a branch passage having an opening into the air passage, air pressure variation detecting means in the branch passage responsive to variation in air pressure in the opening, jet means for delivering air flow through the first passage past the opening to the branch passage, wherein the improvement comprises the following: (i) said jet means being located adjacent the opening of the branch passage to enhance the response of the pressure responsive means in the branch passage when air flow through the first passage varies; and (ii) said probe being mounted for movement in a direction which permits the probe to follow the contour of a surface over which it is moving.

2. An air pressure sensor as claimed in claim 1 wherein the probe is mounted on a swinging arm to bear against articles in a shingled stream of articles moving past the probe so that the probe breaks contact with each article in turn, and the increased air flow permitted through the orifice of the probe causes the pressure responsive means to be actuated.

3. An air pressure sensor as claimed in claim 1 wherein the probe is mounted on a parallel linkage to bear on a shingled stream of articles moving past the probe so that the probe can rise and fall as the stream of articles passes below it.

4. An air pressure sensor as claimed in claim 1 wherein the pressure responsive means comprise an element located in the branch passage and displaceable along the branch passage in accordance with variation in pressure in the first passage, and electric switch means to detect and respond to movement of the element towards the first passage when pressure therein falls.

5. An air pressure sensor as claimed in claim 4 wherein the pressure responsive element is movable along the branch passage between stops spaced along the passage, switch means being provided to detect the presence of the element adjacent one stop located furthest from the first passage and to indicate when the element is displaced to the other stop by reduction of air pressure adjacent said opening.

6. An air pressure sensor as claimed in claim 5 wherein the switch for detecting the presence of the element comprises a photo-electric cell operated switch to one side of the branch passage, a light source to the other side of the branch passage, the branch passage being transparent and the element being non-transparent to obstruct the passage of light between the light source and photo-electric cell when the element is in engagement with said one stop and to permit light from the light source to activate the photo-electric cell switch when the element is drawn into engagement with the other stop by reduction of air passage in the branch passage.

7. An air pressure sensor as claimed in claim 5 wherein the element comprises a plunger displaceable along the branch passage.

8. Air pressure sensor as claimed in claim 1 wherein the pressure responsive means comprises a solid state pressure transducer for operating a counter.

9. An air pressure sensor as claimed in claim 8 wherein the air pressure transducer is a solid state pressure transducer connected to an amplifier for amplifying the signal produced and thence to a comparator having an adjustable voltage reference, said comparator having an output for connection to a counter for counting each time the circuit is triggered in response to the transducer.

10. An air pressure sensor as claimed in claim 1 wherein the ratio of the first air passage diameter to jet diameter is 2:1.

11. An air pressure sensor as claimed in claim 1 wherein a counting device is connected to the air pressure variation detecting means.

12. An air pressure sensor as claimed in claim 1 wherein an air pressure source creates a flow of air along the first air passage such that the outlet end of the probe is supported against a surface of an article on a cushion of air escaping from the outlet end to minimize direct contact between the probe and article.

* * * * *